April 19, 1955  J. B. RATELBAND  2,706,612
MULTI-CHAMBER NON-VIBRATING FLEXIBLE SLEEVE VALVE
Filed Oct. 17, 1950  2 Sheets-Sheet 1

INVENTOR
JOHANNES BERNADUS RATELBAND
BY
ATTORNEY

United States Patent Office 2,706,612
Patented Apr. 19, 1955

2,706,612
MULTI-CHAMBER NON-VIBRATING FLEXIBLE SLEEVE VALVE

Johannes B. Ratelband, Barendrecht, Netherlands

Application October 17, 1950, Serial No. 190,623

Claims priority, application Netherlands October 20, 1949

2 Claims. (Cl. 251—5)

This invention relates to a valve, the housing of which is provided between its inflow side and its outflow side with an elongated more or less streamlined body, which is surrounded by a sleeve-like diaphragm, on the outer side of which a chamber is provided to which pressure fluid may be supplied to close the diaphragm on to the elongated body.

Valves of this kind are known having the elastic sleeve-like diaphragm extending on the full length of the inner streamlined body and secured in the housing at its both ends. Experience has shown that under certain conditions the diaphragm is subjected to vibrations.

The object of the invention is to improve a valve of this kind in such a manner that said drawback is removed. According to the invention the diaphragm at its outer side between the ends of the elongated body is provided with two radial collars which are secured to the housing and laterally bound the chamber for the pressure fluid. With said arrangement the pressure area of the diaphragm and consequently the volume of the chamber to which the pressure fluid is supplied will be rather small so that the valve may be rapidly closed. As the active part of the diaphragm occupies only a small portion of the axial length of the inner body the annoying vibrations of the diaphragm are wholly prevented.

With valves which have to seal against high pressures the annular collars are stiffened in radial direction e. g. by providing the collars with an insert of wire gauze or a woven fabric.

In order to reduce the resistance to flow in the valve as far as possible one or more annular ribs may be provided on the diaphragm between the radial collars, said annular ribs being anchored at their circumference in tensioned condition to the housing so that they expand the diaphragm to its position for allowing the passage of fluid. The coaction between the tensioned ribs forming separate pressure chambers with the small portion of the axial length of the inner body contributes to the prevention of annoying vibrations of the diaphragm.

The invention will be further described with reference to the accompanying drawings in which two embodiments of a valve according to the invention are illustrated.

Figure 1:
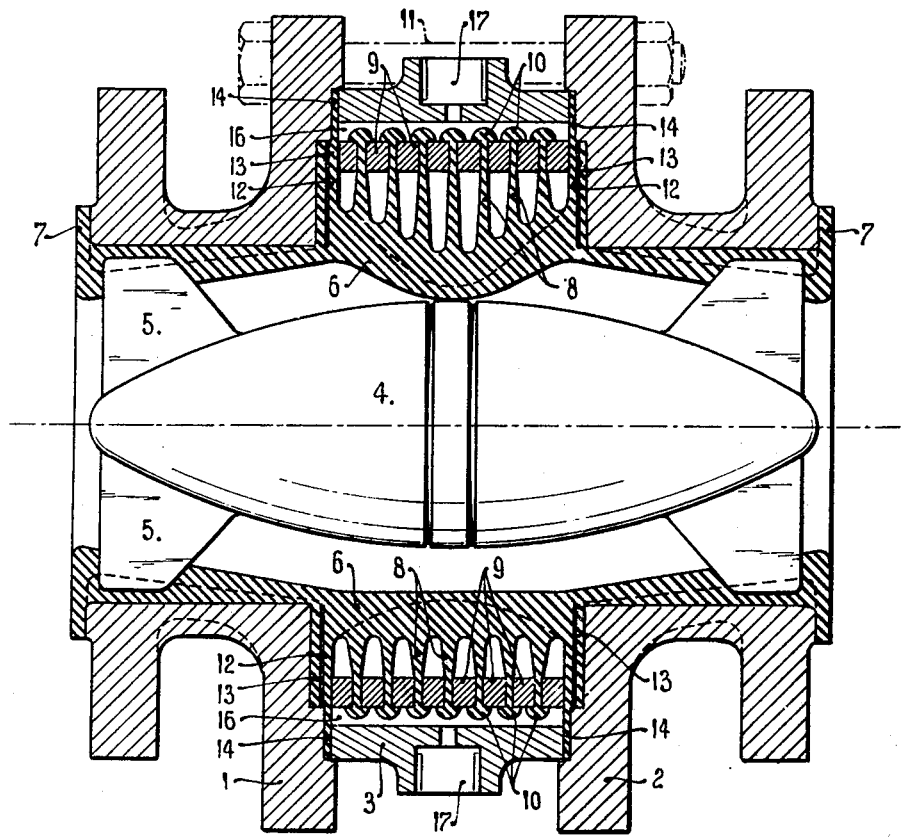
Fig. 1 is a longitudinal section of a valve, the upper half of which is shown in closed and the lower half of which is shown in open condition.

The housing of the valve consists of two end pieces 1 and 2 and a cylindrical body 3 clamped therebetween. The housing accommodates an elongated body 4 extending from the inflow side to the outflow side and being provided at both its ends with several longitudinal ribs 5.

The sleeve-like diaphragm consists of rubber or a like resilient material and has a central portion 6 constituting the diaphragm proper. With the embodiment shown in Fig. 1 the diaphragm is extended at both sides of the central portion and terminates at each end in a flange 7 serving as a sealing disc for the adjacent flange of the conduit or other body to which the valve is to be secured. With said embodiment the central part 6 of the diaphragm at its outer surface is provided with a plurality of thin ribs 8 clamped between rings 9 which each may consist of two parts. The radial ribs 8 are each provided with a thickened rim 10 bearing on adjacent rings 9 and the required clamping is obtained by means of bolts 11 serving to unite the parts 1, 2 of the housing with the intermediate part 3.

The diaphragm is further provided with two collars 12 each having an insert 13 for stiffening them. Said collars terminate in a thin rim 14 serving as a packing ring between the intermediate part 3 and the end pieces 1, 2 of the housing.

As the insert or stiffening member 13 extends through the whole radial width of the collars 12 and thus to the outer edge of the clamping rings 9 an efficient clamping of said collars is obtained and displacement of the collars is prevented also when high pressures occur. For lower pressure the stiffening members need not to extend through the whole width of the collars 12 and may also be dispensed with.

The collars 12 of the diaphragm are laterally bounding the chamber 16 formed in the intermediate part 3 of the housing to which a pressure fluid for closing the diaphragm on to the central body 4 may be supplied at 17. If the chamber 16 is not subjected to pressure, the radial ribs 8 will hold the central portion 6 of the diaphragm in expanded position, so that the liquid or gas may freely pass through the valve. If, however, pressure fluid is supplied to the chamber the diaphragm is closed on to the central body 4, whereby the ribs 8 are tensioned. The thick walled part 6 of the diaphragm is thereby compressed.

Figure 2:
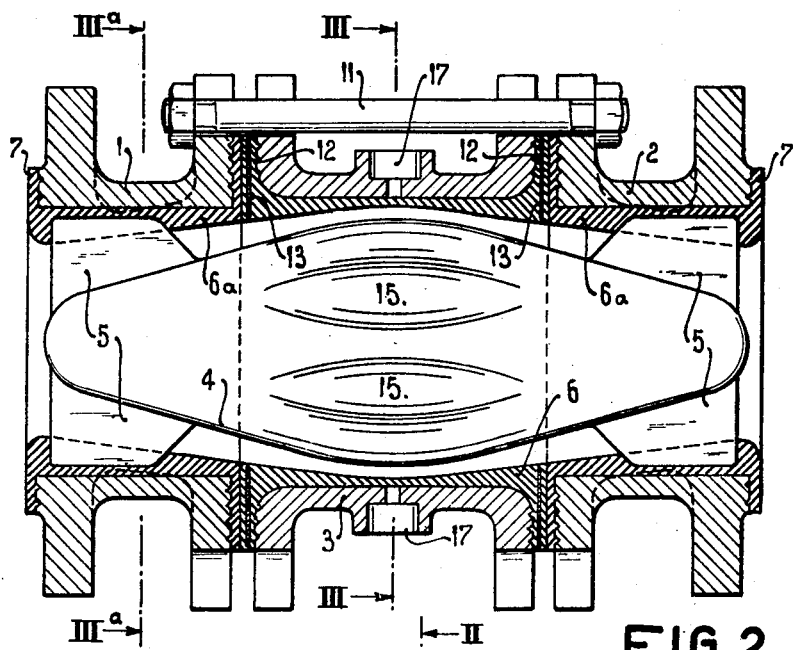
Fig. 2 is a longitudinal section of a valve according to a second embodiment and Fig. 3 is a cross section thereof partly taken along the line IIIa—IIIa of Fig. 2.
Figure 3:
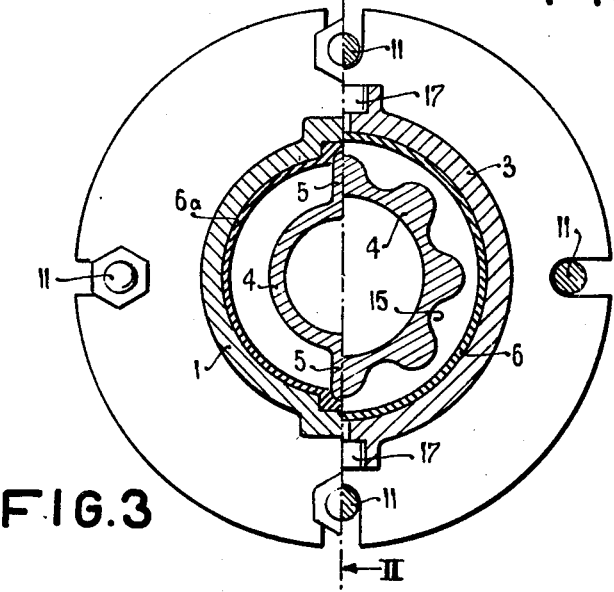

With the embodiment shown in Figs. 2 and 3 the diaphragm is provided with separate end pieces 6a. In untensioned condition the central part 6 of the diaphragm bears against the inner side of the intermediate part 3 of the casing, so that the pressure chamber is only formed when the diaphragm closes on to the elongated body 4. In order to prevent the formation of folds in the diaphragm when it is in its closed position the body 4 is provided with a number of grooves 15 in its central part so as to increase the circumferential area of the body to such a degree that the diaphragm is applied on the corrugated circumference of the body 4 without folds.

The invention is not restricted to the illustrated embodiment as with a valve for chemically inactive liquids the cylindrical end pieces 6a of the diaphragm may be dispensed with, as said parts only serve for protecting the housing. In said instance the central body 4 could be united to one of the parts 1, 2 of the housing so as to form an integral body therewith.

The ribs 8 of the diaphragm, shown in Fig. 1 are preferably provided with radial cuts so that they form separate tongues or lugs. Said cuts afford the pressure fluid access to the outer side of the central part 6 of the diaphragm and facilitate the expansion of the diaphragm when tensioning the ribs.

The pressure chamber 16 may be formed or connected to a cylinder in which a piston operates which may be actuated by hydraulic or electro-magnetic means or also manually for closing the diaphragm on to the central body 4.

What I claim is:

1. A valve, comprising a housing and an elongated core body located in said housing and leaving at its circumference an annular passageway with respect to the inside of the housing, a flexible diaphragm surrounding said body, the outer side of said diaphragm and the said housing forming a chamber adapted to receive pressure fluid to close the diaphragm onto the core body, said diaphragm being provided at its circumference with two outwardly directed collars forming lateral walls of the said pressure chamber and being secured at their marginal portion to the said housing, the diaphragm being further provided between both said collars with at least one outwardly directed annular rib secured in tensioned condition at its marginal portion to the housing, so as to expand the diaphragm to its open position for allowing the passage of fluid, while upon feeding pressure fluid into the said chamber, the said diaphragm is moved into its closing position engaging the said core body.

2. A valve, comprising a housing and an elongated core body located in said housing and leaving at its circumference a passageway with respect to the inside of the housing, a flexible diaphragm surrounding said body, the outer side of said diaphragm and the said housing orming a chamber adapted to receive pressure fluid to close the diaphragm on to the core body, said diaphragm being provided at its circumference with two outwardly directed collars forming lateral walls of the said pressure chamber and being secured at their marginal portion to the said housing, the diaphragm being further provided between both said collars with outwardly directed annular ribs and clamping rings cooperating with each of said ribs and disposed between each pair of adjacent ribs, and each of the said ribs having a thickened rim and bearing with said rim on the cooperating clamping rings.

References Cited in the file of this patent

UNITED STATES PATENTS

| | | |
|---|---|---|
| 1,731,571 | Heare | Oct. 15, 1929 |
| 1,914,600 | Hewitt | June 20, 1933 |
| 2,247,363 | Dunn | July 1, 1941 |
| 2,467,150 | Nordell | Apr. 12, 1949 |
| 2,518,625 | Langstaff | Aug. 15, 1950 |
| 2,573,712 | Kallam | Nov. 6, 1951 |
| 2,576,810 | Ratelband | Nov. 27, 1951 |
| 2,577,613 | Friberg | Dec. 4, 1951 |
| 2,590,215 | Sausa | Mar. 25, 1952 |